(12) United States Patent
Kai

(10) Patent No.: US 9,921,999 B2
(45) Date of Patent: Mar. 20, 2018

(54) ELECTRONIC DEVICE, DISPLAY METHOD AT TIME OF EXECUTION OF VERIFICATION WITH ELECTRONIC DEVICE, AND STORAGE MEDIUM

(71) Applicant: CASIO COMPUTER CO., LTD., Tokyo (JP)

(72) Inventor: Rie Kai, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 157 days.

(21) Appl. No.: 14/948,719

(22) Filed: Nov. 23, 2015

(65) Prior Publication Data
US 2016/0188526 A1 Jun. 30, 2016

(30) Foreign Application Priority Data
Dec. 24, 2014 (JP) ................................. 2014-259833

(51) Int. Cl.
*G06F 15/02* (2006.01)
(52) U.S. Cl.
CPC ................................ *G06F 15/0225* (2013.01)
(58) Field of Classification Search
CPC .................................................. G06F 15/0225
See application file for complete search history.

(56) References Cited

U.S. PATENT DOCUMENTS

| | | | | |
|---|---|---|---|---|
| 5,189,633 A | * | 2/1993 | Bonadio | G06F 3/033 708/142 |
| 7,155,745 B1 | * | 12/2006 | Shin | G06F 9/547 709/229 |
| 2006/0062470 A1 | * | 3/2006 | Zhu | G06K 9/222 382/186 |

FOREIGN PATENT DOCUMENTS

| | | |
|---|---|---|
| JP | 2000-298423 A | 10/2000 |
| JP | 2011-232468 A | 11/2011 |

* cited by examiner

*Primary Examiner* — Chuong D Ngo
(74) *Attorney, Agent, or Firm* — Fitch Even Tabin & Flannery LLP

(57) ABSTRACT

An electronic device includes a display unit and a processor. The processor performs an input process to receive an input of a first mathematical expression including a left side member, an equality sign or inequality sign, and a right side member expressed in this order; a first mathematical expression display process to display, on the display unit, the input first mathematical expression; a verification process to verify whether the input first mathematical expression is true or false; and a second mathematical expression display process to display, on the display unit, the right side member of the verified first mathematical expression as a left side member of a second mathematical expression to be newly verified, if the first mathematical expression is determined to be true as a result of verification by the verification process.

15 Claims, 6 Drawing Sheets

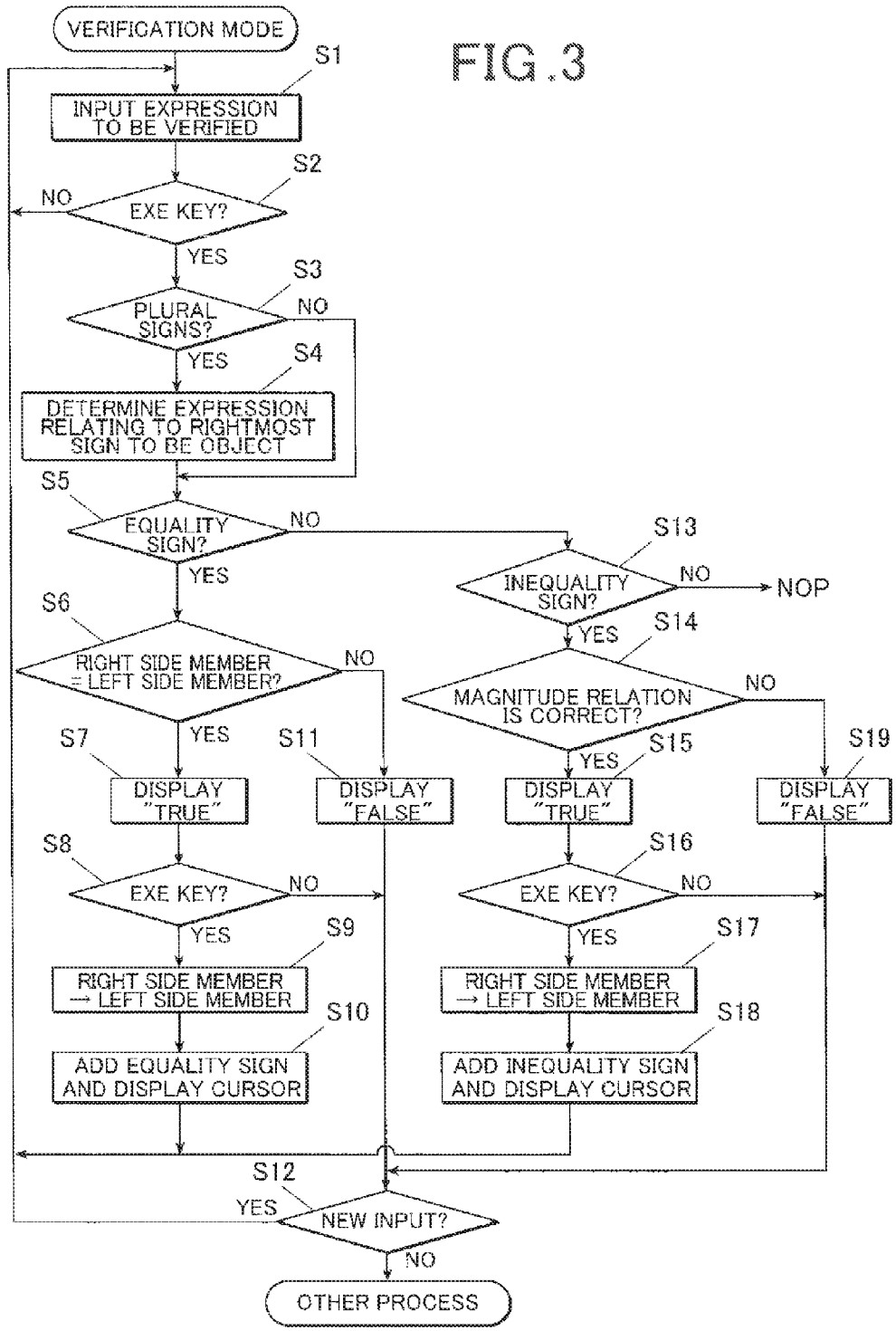

FIG.5A $(x+1)(x+5)=x^2+x+5$
$x+5$ |
— Cu

FIG.5B  (EXE)

$(x+1)(x+5)=x^2+x+5$
$x+5$
  TRUE

FIG.5C  (EXE)

FIG.5E  (EXE)

$x^2+x+5x+5=x^2+6x+5$
  TRUE 0.8<1.2    TRUE

3/5<0.8<1.2    TRUE

ELECTRONIC DEVICE, DISPLAY METHOD AT TIME OF EXECUTION OF VERIFICATION WITH ELECTRONIC DEVICE, AND STORAGE MEDIUM

CROSS-REFERENCE TO RELATED APPLICATION

This application is based upon and claims the benefit of priority from the prior Japanese Patent Application No. 2014-259833, filed on Dec. 24, 2014, the entire contents of which are incorporated herein by reference.

BACKGROUND OF THE INVENTION

1. Field of the Invention

The present invention relates to an electronic device, and more particularly to an electronic device, such as a scientific electronic calculator having a verification function.

2. Description of Related Art

Electronic devices, such as scientific electronic calculators, having a verification function have been known. For example, Japanese Unexamined Patent Application Publication No. 2000-298423 discloses a calculation display device. When a user inputs an arithmetic expression, inputs a solution obtained by the user's own calculation, and performs a key operation for verification of the solution, the calculation display device disclosed in this document compares the user's solution with a plurality of solutions of the arithmetic expression and displays the information representing "true" or "false" (i.e., "correct" or "incorrect" etc.).

Japanese Unexamined Patent Application Publication No. 2011-232468 discloses an electronic device having a verification function to determine whether the solution of an input equation matches the solution of an input deformed equation. The electronic device disclosed in this document can perform a verification process when a replacement equation is input, which replacement equation is an equation with a replacement expression input by a user.

With a scientific electronic calculator hitherto known having a verification function, when an expression including an equality sign (=) or an inequality sign (>, <, ≥, ≤) is input, the calculator compares the left side member with the right side member and determines whether the equality or inequality is true, i.e., determines the truth or falseness.

When a user develops an expression on a sheet of paper, such as a notebook, he or she usually develops the expression step by step by writing the following expressions.

$$(x+1)(x+5) = x^2 + x + 5x + 5 \quad (1)$$
$$= x^2 + 6x + 5 \quad (2)$$

When the developed expression is to be verified with the verification function of an electronic device hitherto known, the expression $(x+1)(x+5)=x^2+x+5x+5 \ldots (1)$ is input and the truth or falseness is determined by the verification function. If the expression is determined to be true, a user has to newly input the right side member of the mathematical expression (1) as the left side member, in such a manner as "$x^2+x+5x+5=x^2+6x+5$", to input an expression to be determined next.

Similar problems arise in the case of factorizations and mathematical expressions with inequality signs etc. Hence, better usability has been demanded for electronic devices with a verification function.

SUMMARY OF THE INVENTION

An object of the present invention is to provide an electronic device having enhanced usability that enables easy entry of expressions to be verified at the time of execution of a verification function.

An electronic device according to one aspect of the present invention includes: a display unit; and a processor which performs: an input process to receive an input of a first mathematical expression including a left side member, an equality sign or inequality sign, and a right side member expressed in this order; a first mathematical expression display process to display, on the display unit, the first mathematical expression input by the input process; a verification process to verify whether the first mathematical expression input by the input process is true or false; and a second mathematical expression display process to display, on the display unit, the right side member of the first mathematical expression verified by the verification process, as a left side member of a second mathematical expression to be newly verified, if the first mathematical expression is determined to be true as a result of verification by the verification process.

Effects of the Invention

The present invention provides an electronic device having enhanced usability for a user that enables easy entry of expressions to be verified at the time of execution of a verification function.

BRIEF DESCRIPTION OF THE DRAWINGS

The above and other objects, advantages and features of the present invention will become more fully understood from the detailed description given hereinbelow and the appended drawings which are given byway of illustration only, and thus are not intended as a definition of the limits of the present invention.

FIG. 3 is a flowchart describing the operation in a verification mode.

FIGS. 5A to 5E show example display.

EMBODIMENTS TO CARRY OUT THE INVENTION

Figure 1:
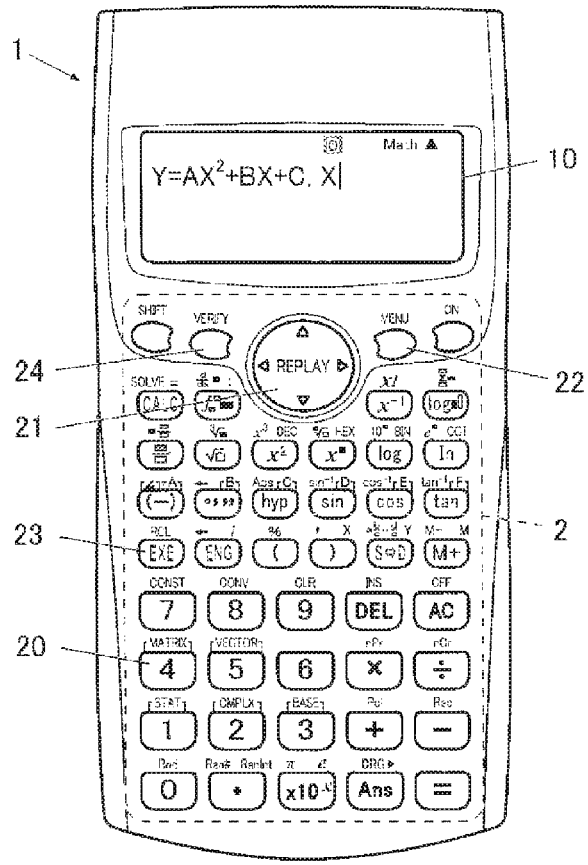
FIG. 1 is a plan view showing the external appearance of a scientific electronic calculator as an example of an electronic device.

An electronic device according to an embodiment of the present invention will now be described with reference to the drawings. The case in which the electronic device is a scientific electronic calculator is described below. The present invention, however, is not limited to a scientific electronic calculator. The present invention may be applied to any electronic device that contains application programs installed therein and that can perform calculation of expressions and comparison of numbers, such as smartphones and personal digital assistances. The scope of the invention is not limited to the examples shown in the drawings.

FIG. 1 is a plan view of a scientific electronic calculator according to this embodiment. The scientific electronic calculator 1 includes an input key group 2 having various keys and includes a display unit 10.

The input key group 2 receives input operations from a user to receive inputs of numerical values and calculation symbols etc. The input key group 2 includes multiple keys having their respective unique functions. Specifically, the input key group 2 includes a numeric keypad 20, a cursor key 21, a MENU key 22, an EXE key 23, and a VERIFY key 24 etc.

The numeric keypad 20 receives input operations to receive inputs of numerical values. The cursor key 21 is pressed for moving a cursor, which indicates the position of an object of editing or an object of selection, in a predetermined direction on the display unit 10. Four directions, up, down, left, and right, can be input through the cursor key 21.

The MENU key 22 is pressed when the user makes settings and selections for various functions. The EXE key 23 is pressed for executing predetermined processes. The VERIFY key 24 is pressed for setting the scientific electronic calculator 1 to a verification mode and for causing a CPU 11 (described later) to perform a verification process.

The display unit 10 is composed of, for example, a liquid crystal display (LCD). The display unit 10 displays various pieces of data according to user operations, such as numbers, mathematical expressions, and results of verification in the verification mode.

[Internal Configuration]

Figure 2:
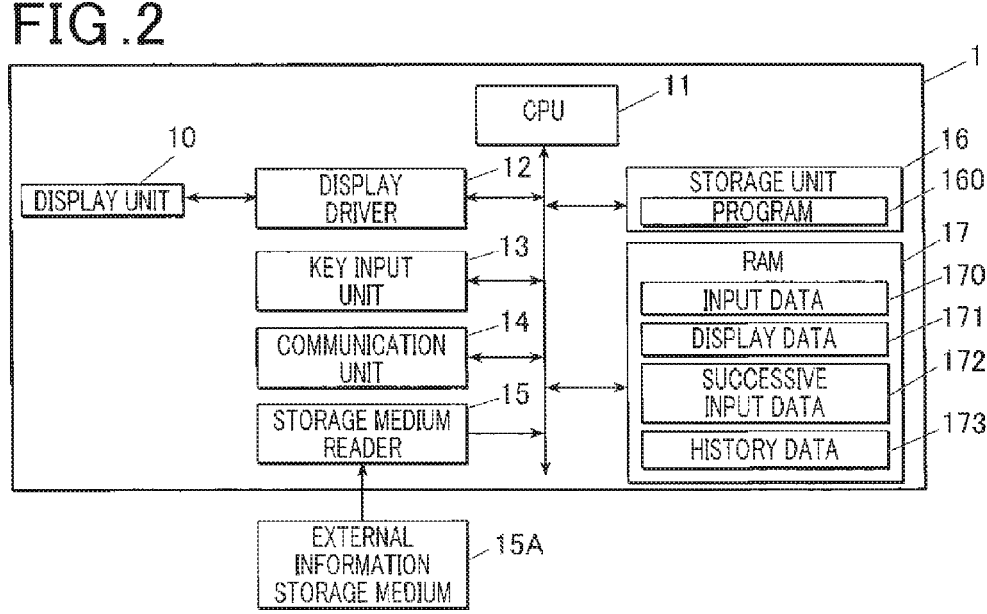
FIG. 2 is a block diagram showing the internal configuration of the scientific electronic calculator.

FIG. 2 is a block diagram showing the internal configuration of the scientific electronic calculator 1. The scientific electronic calculator 1 includes a central processing unit (CPU) 11, a display driver 12, a key input unit 13, a communication unit 14, a storage medium reader 15, a storage unit 16, and a random access memory (RAM) 17.

The display driver 12 performs driving under the control of the CPU 11 to display various pieces of information on the display unit 10.

The key input unit 13 outputs, to the CPU 11, key input signals corresponding to the keys that have received inputs by user operations. When mathematical expression data is input from the key input unit 13, the CPU 11 causes the display driver 12 to display the input mathematical expression on the display unit 10, performs calculations, performs a verification process, or performs various types of processes.

The communication unit 14 is a unit through which the scientific electronic calculator 1 communicates with external devices (e.g. servers and computers) on a network (not shown) when the scientific electronic calculator 1 is connected to the network.

The storage medium reader 15 reads information from an external information storage medium 15A, such as a removable USB memory inserted in the scientific electronic calculator 1. The program according to the present invention, described later, may be read from the external information storage medium 15A through the storage medium reader 15. Further, the program according to the present invention may be read out from the scientific electronic calculator 1 into the external information storage medium 15A.

The storage unit 16 includes a storage area 160 to store various programs including the program according to the present invention and stores other necessary data and information.

The RAM 17 is a work area for the CPU 11 to perform various types of processes. The RAM 17 includes an input data storage area 170 where the data input through the input key group 2 by a user operation is temporarily stored; a display data storage area 171 where the data to be displayed on the display unit 10 is temporarily stored; a successive input data storage area 172 where the data necessary for successive inputs, described later, is temporarily stored; and a history data storage area 173 where history data of mathematical expressions that have been determined to be true, described later, is temporarily stored.

The CPU 11 centrally controls the units of the scientific electronic calculator 1. Specifically, the CPU 11 loads a program, which is specified from among the system programs and various application programs stored in the storage area 160 of the storage unit 16, into the work area of the RAM 17 to perform various types of processes in cooperation with the program loaded on the RAM. The CPU 11 also controls the display driver 12 to perform display on the display unit 10 as necessary.

[Operations]

The operations of the scientific electronic calculator 1 will now be described with reference to the flowcharts.

[Operation in Verification Mode]

The CPU 11 of the scientific electronic calculator 1 shifts into a verification mode when the user presses the VERIFY key 24 (see FIG. 1). In the verification mode, a verification process is performed where an input mathematical expression is verified and the result of verification, truth or falsehood, is output as described below. This process is described with reference to the flowchart of FIG. 3.

Figure 4A:
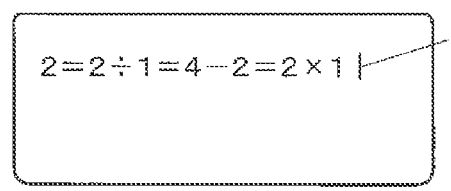
FIGS. 4A to 4C show example display.

When a mathematical expression to be verified is input through a key operation by a user, the CPU 11 displays the input mathematical expression on the display unit 10 (Step S1). When the EXE key 23 is pressed (Step S2: Yes), the CPU 11 performs the verification process. At this time, the CPU 11 determines whether the input mathematical expression includes a plurality of equality signs or inequality signs as in FIG. 4A (Step S3). If a plurality of equality signs or inequality signs are included (Step S3: Yes), the CPU 11 determines the expression relating to the rightmost equality sign or inequality sign ("4−2=2×1" in the case of FIG. 4A) to be an object of the verification process (Step S4).

If the input mathematical expression does not include a plurality of equality signs or inequality signs as shown in FIG. 5A (Step S3: No), the CPU 11 skips Step S4 and goes on to Step S5. In the following description, the equality sign and inequality sign are collectively referred to as a sign.

Figure 4B:
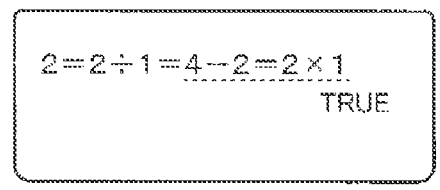

The CPU 11 then determines whether the sign included in the mathematical expression to be verified is an equality sign (Step S5). If the sign is an equality sign (Step S5: Yes), the CPU 11 verifies whether the left side member is equal to the right side member (Step S6). If the left side member is equal to the right side member as a result of the verification (Step S6: Yes), the word "TRUE" is displayed near the mathematical expression on the display unit 10 as shown in FIGS. 4B and 5B (Step S7) to notify the user that the input mathematical expression is correct (i.e., the result of verification is "true").

Figure 4C:
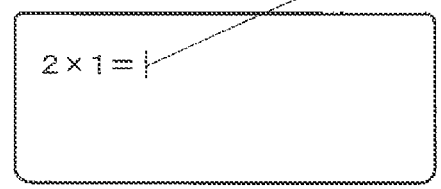

If the EXE key 23 is pressed by the user while the information indicating that the result of verification is "true" is being displayed (Step S8: Yes), the CPU 11 creates a new mathematical expression whose left side member is the right side member of the verified mathematical expression and displays the created mathematical expression as shown in FIGS. 4C and 5C (Step S9). The CPU 11 additionally displays an equality sign on the right of the newly displayed left side member and further displays a cursor Cu on the right of the equality sign (Step S10) to allow the user to input the right side member (Step S1).

The steps described above will now be described based on the internal configuration of the electronic device 1 shown in FIG. 2. Each time the user inputs a number, a character, a symbol, an equality sign, an inequality sign or the like (Step S1), the CPU 11 stores the input data into the input data storage area 170 of the RAM 17 (see FIG. 2) and stores the data, such as mathematical expressions, to be displayed on the display unit 10 in the display data storage area 171.

If the result of the verification process is "true" and the right side member of the verified mathematical expression is moved to and displayed as the left side member of a new mathematical expression (Step S9), the data of the right side member of the mathematical expression stored in the display data storage area 171 (or the right side member of the rightmost equality sign) ("$x^2+x+5x+5$" in the case of FIG. 5B) is extracted as the data necessary for successive input of mathematical expression and is stored in the successive input data storage area 172. The successive input data is sent to the display driver 12 so that the display driver 12 displays the data as the left side member of the new mathematical expression with an equality sign and a cursor Cu added thereto as shown in FIG. 5C.

As shown in FIGS. 4C and 5C, the mathematical expression which has been verified is deleted when a new mathematical expression is to be input. Alternatively, the mathematical expression for which the truth or falseness has been determined by the CPU 11 may be displayed above a new mathematical expression instead of being deleted, if there is an enough display space.

If the user further inputs the right side member (Step S1, see FIG. 5D) in the state shown in FIG. 5C and presses the EXE key 23 (Step S2: Yes), the CPU 11 performs the verification in the same manner as described above (Steps S5 and S6). If the left side member is equal to the right side member as a result of the verification, the CPU 11 displays the word "TRUE" as shown in FIG. 5E (Step S7).

Although not shown in the drawings, if the EXE key 23 is further pressed in the state shown in FIG. 5E, the CPU 11 displays the right side member ("$x^2+6x+5$" in this case) of the verified mathematical expression as the left side member of a new mathematical expression (Step S9). The CPU 11 additionally displays an equality sign on the right of the newly displayed left side member and displays a cursor Cu on the right of the equality sign (Step S10) to allow the user to input the right side member.

If the CPU 11 determines that the left and right side members of an equality sign in the mathematical expression to be verified are not equal to each other as a result of the verification (Step S6: No), the CPU 11 displays the word "FALSE" (Step S11) to notify the user that the input mathematical expression is incorrect (i.e., the result of verification is "false").

If the user presses keys of "↑", "←", and "→" in the cursor key 21 to correct errors or performs a key operation to input a new mathematical expression, the CPU 11 determines that a new input is to be performed (Step S12: Yes) and moves a cursor in a designated direction to allow the user to correct a mathematical expression on the display or returns to the step of inputting a new mathematical expression (Step S1). When the user presses the "↓" key in the cursor key 21, the CPU 11 performs another process, which is described later.

Figure 6A:
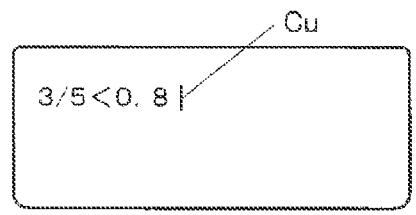
FIGS. 6A to 6E show example display.
Figure 6B:
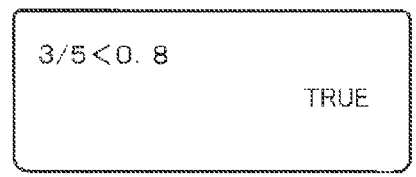

If the sign included in the mathematical expression to be verified is not an equality sign (Step S5: No), the CPU 11 determines whether the sign included in the mathematical expression is an inequality sign (Step S13). If the sign included in the mathematical expression is an inequality sign (Step S13: Yes, see FIG. 6A), the CPU 11 verifies whether the magnitude relation expressed by the inequality sign is correct (Step S14). If the magnitude relation is correct as a result of the verification (Step S14: Yes), the CPU 11 displays the word "TRUE" (Step S15) as shown in FIG. 6B to notify the user that the result of verification is "true".

Figure 6C:
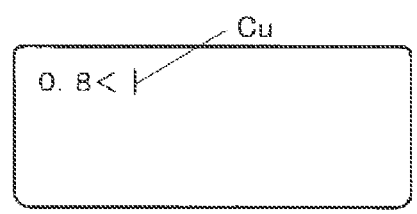

If the EXE key 23 is pressed by the user in this state (Step S16: Yes), the CPU 11 displays the right side member of the verified mathematical expression as the left side member of a new mathematical expression as shown in FIG. 6C (Step S17), additionally displays, on the right of the newly displayed left side member, the same inequality sign as the one previously input, and further displays a cursor Cu on the right of the inequality sign (Step S18) to allow the user to input the right side member.

The processing of data in the internal configuration of the electronic device 1 in the case of inequality sign is similar to that of the case of equality sign described above (see Step S8 and the subsequent steps), the redundant explanations are omitted. In the case of FIG. 6C, the mathematical expression for which the truth or falseness has been determined by the CPU 11 may be displayed above a new mathematical expression instead of being deleted, as in the case of equality sign.

Figure 6D:
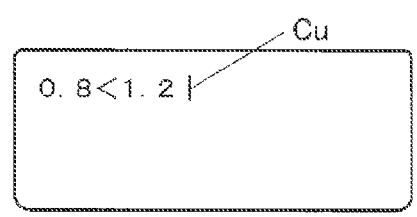

If the user further inputs the right side member (Step S1, see FIG. 6D) and presses the EXE key 23 (Step S2: Yes) in the state shown in FIG. 6C, the CPU 11 determines the truth or falseness of the magnitude relation in the same manner as shown above (Steps S13 and S14). If the magnitude relation is correct as a result of the verification (Step S14: Yes), the CPU 11 displays the word "TRUE" (Step S15) as shown in FIG. 6E.

Figure 6E:
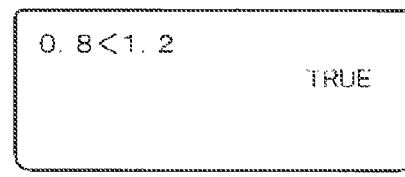

Although not shown in the drawings, if the EXE key 23 is further pressed in the state shown in FIG. 6E, the CPU 11 displays the right side member of the verified mathematical expression ("1.2" in this case) as the left side member of a new mathematical expression (Step S17) and additionally displays an inequality sign on the right of the newly displayed left side member and further displays a cursor Cu on the right of the inequality sign (Step S18) to allow the user to input the right side member.

If the CPU 11 determines that the magnitude relation is incorrect as a result of the verification (Step S14: No), the CPU 11 displays the word "FALSE" (Step S19) to notify the user that the input mathematical expression is incorrect (i.e., the result of verification is "false").

If the user performs key operations to correct errors or to input a new mathematical expression in the same manner as described above, the CPU 11 determines that a new input is to be performed (Step S12: Yes). Accordingly, the CPU 11 corrects the mathematical expression on the display or returns to the step of inputting a new mathematical expression (Step S1).

If the EXE key 23 has been pressed by the user (Step S2: Yes) but the mathematical expression to be verified does not include an equality sign or inequality sign (Step S5: No and Step S13: No), the CPU 11 does not perform the verification (see NOP, i.e., no operation).

[Process of Displaying History]

If the result of verification is "true" in the verification process of Step S6 or S14, the CPU 11 stores, in the successive input data storage area 172, the data of the right side member of the verified mathematical expression (or the data of the right side member of the rightmost equality sign) from among the display data stored in the display data storage area 171 of the RAM 17.

At this time, the CPU 11 cumulatively stores the successive input data also as history data in the storage area 173 of the RAM 17. The successive input data is deleted by being overwritten with new successive input data when a next new mathematical expression is input, while the history data stored in the history data storage area 173 is not deleted.

Hence, in the present embodiment, all the mathematical expression data (history data) determined to be true by a series of the verification processes, i.e., the data of the right side members of the verified mathematical expressions described above, is stored and retained in the storage area 173 of the RAM 17.

In response to a predetermined user operation, the CPU 11 displays the history of the mathematical expressions determined to be true in the form of a single mathematical expression. This process will now be described in detail with reference to the flowchart of FIG. 7.

Figures 7, 8A:
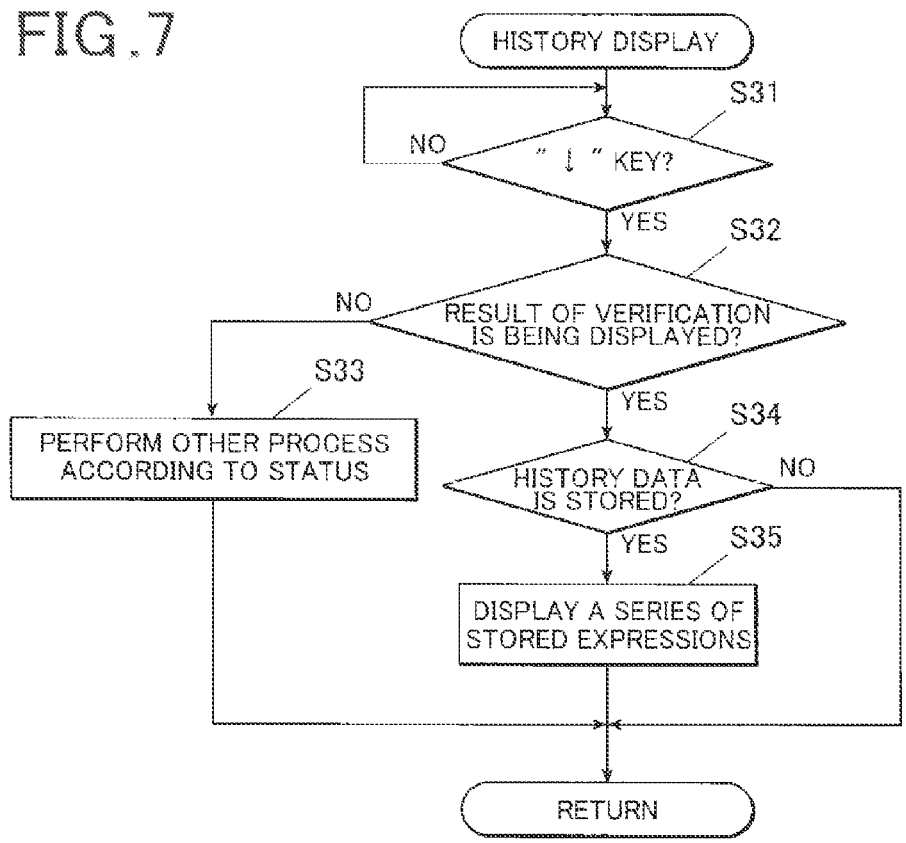
FIG. 7 is a flowchart describing the operation of a history display process.
FIGS. 8A and 8B show example display.

If the CPU 11 determines that the "↓" key in the cursor key 21 has been pressed (Step S31: Yes) in the verification mode and the word "TRUE", which is a result of verification, is being displayed (Step S32: Yes) as shown in FIG. 8A, the CPU 11 performs a history display process as described below. If the result of the verification is not being displayed (Step S32: No), the CPU 11 determines that the "↓" key has been pressed in a normal process and thus performs the process according to the status, i.e., moving a cursor downward etc. (Step S33)

Figure 8B:
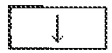

If the word "TRUE" is being displayed (Step S32: Yes), the CPU 11 refers to the storage area 173 of the RAM 17 and determines whether the history data is stored (Step S34). If the history data is stored (Step S34: Yes), the CPU 11 reads the history data from the storage area 173, connects the pieces of the history data with equality signs or inequality signs, and displays the series of results of the verification (i.e., the history of the mathematical expressions) in the form of a single mathematical expression (Step S35) as shown in FIG. 8B. FIG. 8B shows the case in which the verification processes have been performed as shown in FIG. 6A to FIG. 6E.

In the case in which a problem requiring arrangement of the numbers 1.2, 0.8, 3/5, 7/4, 1, and 1/2 in ascending order is given, for example, the correct answer "1/2<3/5<0.8<1<1.2<7/4" can be displayed on the display unit 10. The electronic device 1 thus has enhanced usability for the user.

The above description is for the case in which the word "TRUE" is being displayed as a result of verification. The history display process may also be performed when the word "FALSE" is being displayed.

In the embodiment described above, an equality sign or an inequality sign is added when the right side member of a verified expression is moved to and displayed as the new left side member. Instead of additionally displaying the sign, the device may allow the user to newly input the right side member including the sign.

The scope of the present invention should not be limited to the embodiment described above but includes the scope defined by the claims and the equivalents thereof.

The entire disclosure of Japanese Patent Application No. 2014-259833 filed on Dec. 24, 2014 including description, claims, drawings, and abstract are incorporated herein by reference in its entirety.

Although an exemplary embodiment has been shown and described, the invention is not limited to the embodiment shown. Therefore, the scope of the invention is intended to be limited solely by the scope of the claims that follow.

What is claimed is:

1. An electronic calculator device comprising:
   a display unit; and
   a processor which performs:
      an input process to receive an input of a first mathematical expression including a left side member, an equality sign or inequality sign, and a right side member expressed in this order;
      a first mathematical expression display process to display, on the display unit, the input first mathematical expression;
      a verification process to verify whether the input first mathematical expression is true or false;
      an automatic mathematical expression create process to, upon an input by a user, automatically create the same mathematical expression as the right side member of the verified first mathematical expression, if the first mathematical expression is determined to be true as a result of verification by the verification process; and
      a second mathematical expression display process to display, on the display unit, the created same mathematical expression, as a new left side member of a second mathematical expression to be newly verified, if the first mathematical expression is determined to be true as a result of verification by the verification process,
   wherein, if the first mathematical expression includes a plurality of equality signs or inequality signs, the verification process verifies a third mathematical expression relating to a rightmost one of the equality signs or inequality signs, the third mathematical expression being a part of the first mathematical expression.

2. The electronic calculator device according to claim 1, wherein
   the second mathematical expression display process additionally displays the quality sign or inequality sign, which is included in the verified first mathematical expression to the right of the new left side member of the second mathematical expression displayed on the display unit, with a space for a right side member of the second mathematical expression being blank on the display unit to allow a user to input the new right side member of the second mathematical expression.

3. The electronic calculator device according to claim 1, wherein
   the second mathematical expression display process displays the new left side member of the second mathematical expression in response to a user instruction if the first mathematical expression is determined to be true as the result of the verification by the verification process.

4. The electronic calculator device according to claim 1, wherein
   the processor further performs:
      a storing process to store a history of the first mathematical expression determined to be true by the verification process; and a history display process to display, in a form of a single mathematical expression, the history of the stored first mathematical expression.

5. The electronic calculator device according to claim 1, wherein
the second mathematical expression display process displays, on the display unit, the right side member of the verified first mathematical expression, as the new left side member of the second mathematical expression, without displaying the left side member of the first mathematical expression verified by the verification process.

6. A display method at a time of execution of verification with an electronic calculator device, the method comprising:
an input step to receive an input of a first mathematical expression including a left side member, an equality sign or inequality sign, and a right side member expressed in this order;
a first mathematical expression display step to display, on a display unit, the input first mathematical expression;
a verification step to verify whether the input first mathematical expression is true or false;
an automatic mathematical expression create step to, upon an input by a user, automatically create the same mathematical expression as the right side member of the verified first mathematical expression, if the first mathematical expression is determined to be true as a result of verification by the verification step; and
a second mathematical expression display step to display, on the display unit, the created same mathematical expression, as a new left side member of a second mathematical expression to be newly verified, if the first mathematical expression is determined to be true as a result of verification by the verification step,
wherein, if the first mathematical expression includes a plurality of equality signs or inequality signs, the verification step verifies a third mathematical expression relating to a rightmost one of the equality signs or inequality signs, the third mathematical expression being a part of the first mathematical expression.

7. The display method according to claim 6, wherein
the second mathematical expression display step additionally displays the equality sign or inequality sign, which is included in the verified first mathematical expression to the right of the new left side member of the second mathematical expression displayed on the display unit, with a space for a new right side member of the second mathematical expression being blank on the display unit to allow a user to input the new right side member of the second mathematical expression.

8. The display method according to claim 6, wherein
the second mathematical expression display step displays the new left side member of the second mathematical expression in response to a user instruction if the first mathematical expression is determined to be true as the result of the verification by the verification step.

9. The display method according to claim 6, further comprising:
a storing step to store a history of the first mathematical expression determined to be true by the verification step; and
a history display step to display, in a form of a single mathematical expression, the history of the stored first mathematical expression.

10. The display method according to claim 6, wherein
the second mathematical expression display step displays, on the display unit, the right side member of the verified first mathematical expression, as the new left side member of the second mathematical expression, without displaying the left side member of the first mathematical expression verified by the verification step.

11. A non-transitory computer readable storage medium having stored therein a program to allow a computer of an electronic calculator device including a display unit, to perform:
an input process to receive an input of a first mathematical expression including a left side member, an equality sign or inequality sign, and a right side member expressed in this order;
a first mathematical expression display process to display, on the display unit, the input first mathematical expression;
a verification process to verify whether the input first mathematical expression is true or false;
an automatic mathematical expression create process to, upon an input by a user, automatically create the same mathematical expression as the right side member of the verified first mathematical expression, if the first mathematical expression is determined to be true as a result of verification by the verification process; and
a second mathematical expression display process to display, on the display unit, the created same mathematical expression, as a new left side member of a second mathematical expression to be newly verified, if the first mathematical expression is determined to be true as a result of verification by the verification process,
wherein, if the first mathematical expression includes a plurality of equality signs or inequality signs, the verification process verifies a third mathematical expression relating to a rightmost one of the equality signs or inequality signs, the third mathematical expression being a part of the first mathematical expression.

12. The non-transitory computer readable storage medium according to claim 11, wherein
the second mathematical expression display process additionally displays the equality sign or inequality sign, which is included in the verified first mathematical expression to the right of the new left side member of the second mathematical expression displayed on the display unit, with a space for a new right side member of the second mathematical expression being blank on the display unit to allow a user to input the new right side member of the second mathematical expression.

13. The non-transitory computer readable storage medium according to claim 11, wherein
the second mathematical expression display process displays the new left side member of the second mathematical expression in response to a user instruction if the first mathematical expression is determined to be true as the result of the verification by the verification process.

14. The non-transitory computer readable storage medium according to claim 11, further having stored therein a program to allow the computer to perform:
a storing process to store a history of the first mathematical expression determined to be true by the verification process; and
a history display process to display, in a form of a single mathematical expression, the history of the stored first mathematical expression.

15. The non-transitory computer readable storage medium according to claim 11, wherein
the second mathematical expression display process displays, on the display unit, the right side member of the verified first mathematical expression, as the new left side member of the second mathematical expression, without displaying the left side member of the first mathematical expression verified by the verification process.

\* \* \* \* \*